Oct. 7, 1947.  F. J. WENZEL  2,428,538
MOTION PICTURE FILM REEL SUPPORTING AND DRIVING APPARATUS
Filed March 8, 1945  2 Sheets-Sheet 1
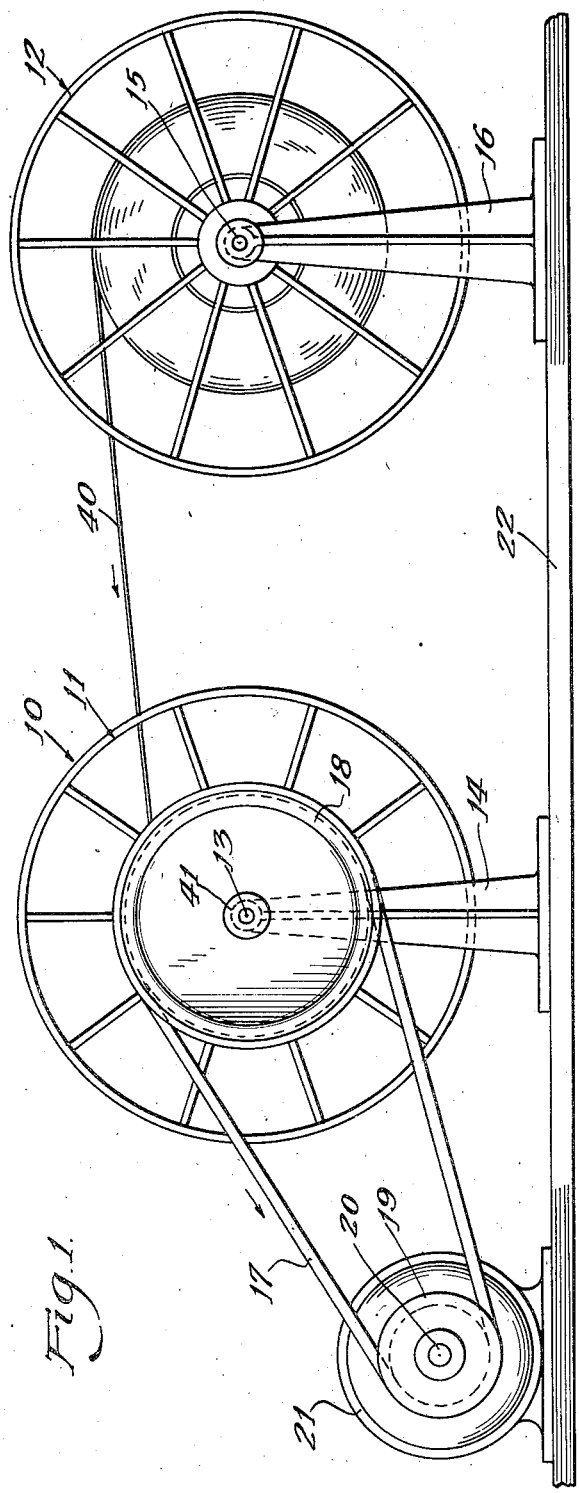
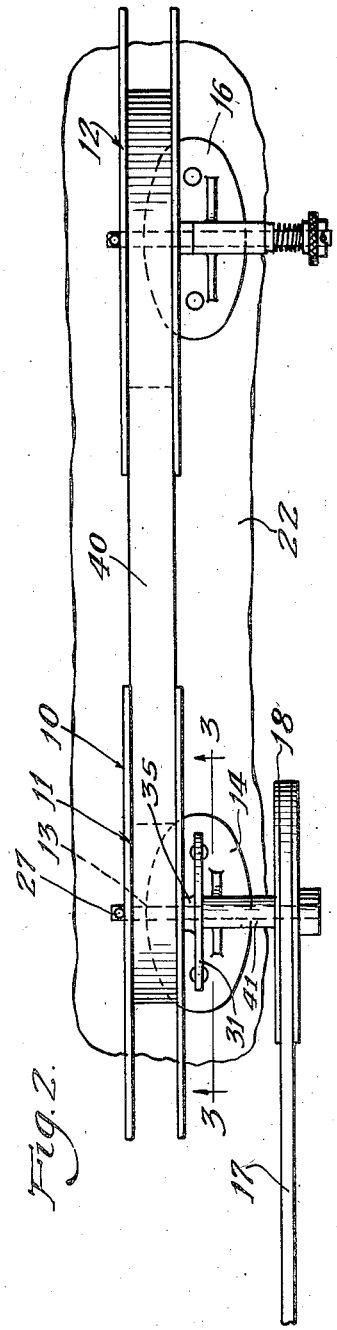
Inventor:
Fred J. Wenzel
By: Wallace and Cannon
Attorneys Oct. 7, 1947.　　　　F. J. WENZEL　　　　2,428,538
MOTION PICTURE FILM REEL SUPPORTING AND DRIVING APPARATUS
Filed March 8, 1945　　　2 Sheets-Sheet 2
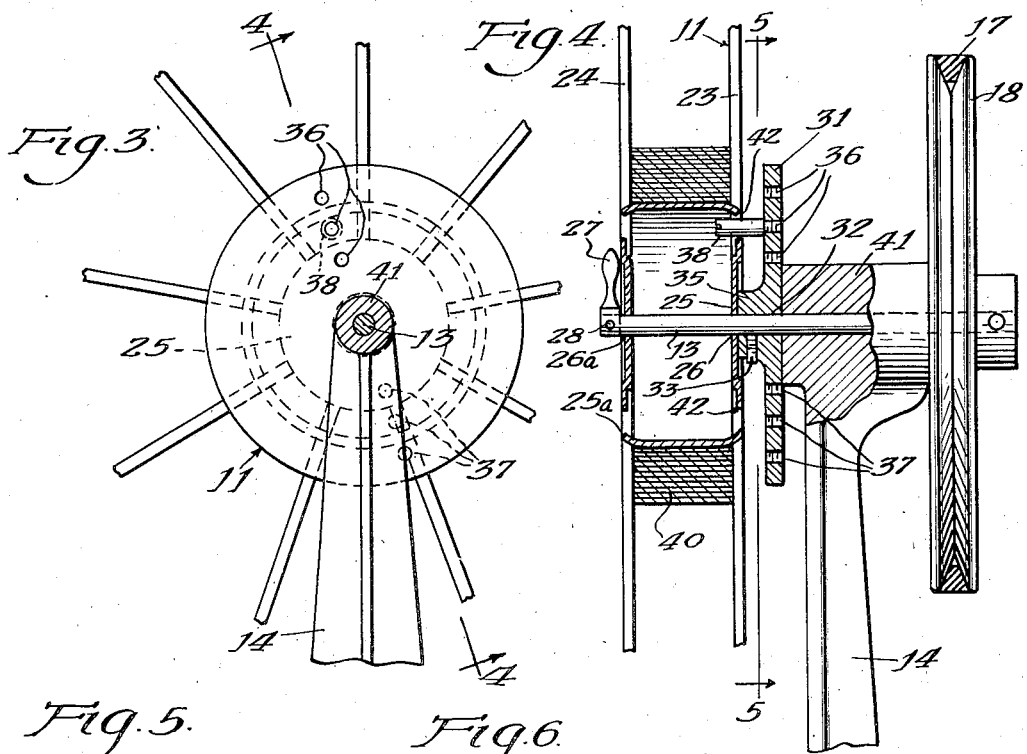
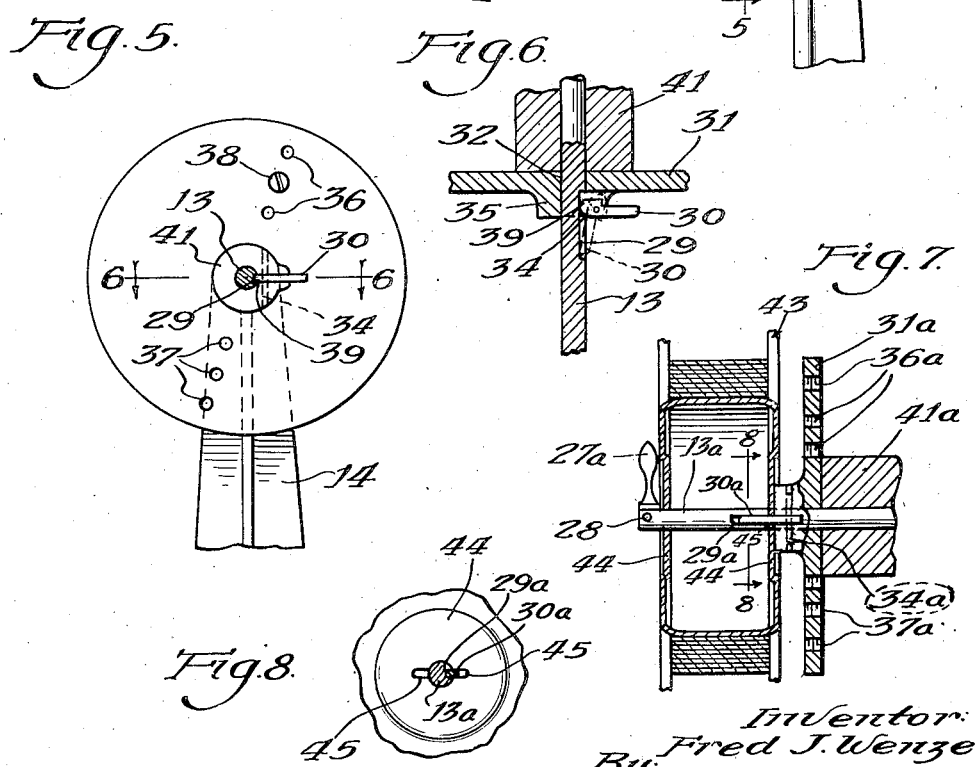
Inventor:
Fred J. Wenzel
By: Wallace and Cannon
Attorneys Patented Oct. 7, 1947

2,428,538

UNITED STATES PATENT OFFICE 2,428,538

MOTION-PICTURE FILM REEL SUPPORTING AND DRIVING APPARATUS

Fred J. Wenzel, Chicago, Ill.

Application March 8, 1945, Serial No. 581,664

9 Claims. (Cl. 242—70)

1

This invention relates to motion picture film reel supporting and driving apparatus.

One of the difficulties heretofore experienced in connection with the use of motion picture film reels upon film rewinding devices, as well as in projectors and the like, has been the fact that after such reels become wound with a considerable length of film they become heavy and exert a drag upon the driving connection between the film reel and its rotary supporting shaft. One result of this is that when it is necessary to start and stop the film reel the inertia of the heavily loaded reel tends to shear the driving connection between the supporting shaft and the reel. This driving connection has heretofore commonly been in the form of a key and slot connection and the tendency to shear is most frequently experienced in the use of film reels upon automatic and hand rewinding devices used in theaters for rewinding 35 mm. film. In examining such films for possible breaks or tears it is frequently necessary for the operator to stop and start the rewinding apparatus and it is during the starting operation that the tendency of the driving connection to shear off, due to the inertia of the heavily loaded reel, is experienced. However, the same difficulty is experienced in the use of commercial motion picture projectors and particularly in starting up the take-up reel after it has been wound with a substantial length of film.

Various attempts have been made heretofore to solve the foregoing and related difficulties experienced in the use of motion picture film reels and supporting shafts therefor and among such attempts has been the provision of an auxiliary driving connection between the film reel supporting shaft and a film reel carried thereby, said auxiliary driving connection having the form of a fixed laterally projecting arm carried by the film-reel-supporting shaft and engageable in an opening in the hub of the film reel. However, such auxiliary driving connections have not been entirely satisfactory due to the fact that the auxiliary driving arm has been permanently attached to a disc on the film reel-supporting shaft and it has, therefore, been impossible to accommodate said auxiliary driving arm to film reels having hubs of varying or different diameters or to film reel hubs having disc-shaped portions provided with apertures spaced at different radial distances from the axial center of the hub of the film reel, or to so-called film exchange reels which are formed of a pair of thin sheet metal side walls in the form of a pair of discs spaced and connected by a hub. This has necessitated re-

2 moving the aforesaid auxiliary driving arm and its mounting entirely from the film reel-supporting shaft when changing from one type of film reel to another and then relying entirely on the primary driving connection, namely, the fixed key and slot driving connection between the film reel and the film reel-supporting shaft hereinbefore referred to, thereby causing a loss of effectiveness in the use of such auxiliary driving connections due, in a substantial measure, to their lack of adaptability.

Moreover, in the use of the aforesaid auxiliary driving connection between a film reel and its rotary driving shaft it has been necessary, when removing the auxiliary driving arm and its supporting member from the film reel-supporting shaft, to remove the entire unit including the key which engages in the key slot to form the primary driving connection between the film reel and its rotary supporting shaft, thereby requiring the expenditure of a substantial amount of time and labor.

Accordingly, an object of the present invention is to provide a new and improved simple but efficient driving connection between a film reel and its rotary supporting shaft and which in use overcomes and is free from the foregoing and other objectionable features of and takes the place of both the primary and the auxiliary driving connections between film reels and their rotary supporting shafts heretofore used in the art.

Another object of the present invention is to construct and arrange the new driving connection in such a manner that it may readily be adapted for use with various types of film reels made by various manufacturers as well as for use with so-called film exchange reels with only a simple and readily made adjustment and without removing the entire driving connection from the rotary film reel-supporting shaft as has been necessary heretofore.

Another object of the invention is to provide a novel driving connection between a motion picture film reel and its rotary supporting shaft which may be used in hand-operated and automatic film rewinding devices as well as in conjunction with the take-up and feed reels and their supporting shafts in motion picture projectors and the like.

Another object of the invention is to provide a novel driving connection between a motion picture film reel and its rotary supporting shaft and which is so constructed that it facilitates the mounting upon and the removal from the reel-supporting shaft of a disc-shaped supporting member which forms a part of the new driving connection between the rotary supporting shaft and a film reel carried thereby.

An additional object of the invention resides in constructing the new driving connection between a motion picture film reel and its supporting shaft in such a manner that it may readily be used in conjunction with motion picture film reels having hubs of varying sizes and diameters and in conjunction with film reels having disc-shaped hub portions provided with varying arrangements of holes or apertures adapted for the reception of a driving pin.

Other and further objects of the present invention will be apparent from the following description and claims and are illustrated in the accompanying drawings which, by way of illustration, show preferred embodiments of the invention and the principles thereof and what I now consider to be the best modes in which I have contemplated applying those principles. Other embodiments of the invention embodying the same or equivalent principles may be used and structural changes may be made as desired by those skilled in the art without departing from the present invention and the purview of the appended claims.

Fig. 1 is an elevational view showing the present invention as embodied in a motion picture film rewinding apparatus;

Fig. 2 is a top plan view of the apparatus shown in Fig. 1;

Fig. 3 is a view on line 3—3 in Fig. 2 partly in section and partly in elevation;

Fig. 4 is a vertical sectional view on line 4—4 in Fig. 3;

Fig. 5 is a view on line 5—5 in Fig. 4 partly in section and partly in elevation;

Fig. 6 is a fragmentary sectional view on line 6—6 in Fig. 5;

Fig. 7 is a fragmentary vertical sectional view showing certain parts of the present invention forming a driving connection between rotary film reel-supporting shaft and a so-called film exchange type of film reel mounted thereon; and Fig. 8 is a fragmentary sectional detail view on line 8—8 in Fig. 7.

A typical embodiment and use of the invention are illustrated in Figs. 1 to 6, inclusive, of the drawings wherein the invention is shown as associated with, and as embodied in, a film rewinding apparatus which includes a take-up reel 11 of the type adapted for use in conjunction with 35 mm. film, and a feed reel 12.

The take-up reel 11 is mounted upon a supporting shaft 13 which, in turn, is journaled in the hub 41 of supporting standard 14, and the feed reel 12 is mounted upon a supporting shaft 15 which is carried by a supporting standard 16. The take-up reel 11 is driven by a belt 17 which works over a pulley 18 carried by the supporting shaft 13 and this belt is driven by a pulley 19 carried by the shaft 20 of an operating motor unit 21. As shown in Fig. 1, the operating motor unit 21, feed reel 12, and take-up reel 11 are mounted upon a common supporting base 22, providing a portable unit.

The construction thus far described forms no part of the present invention and is herein illustrated and described merely to show a typical use and embodiment of the present invention.

The present invention, which will be described in detail presently, has been illustrated in Figs. 1 to 6, inclusive, as being associated with the take-up reel 11 of the film rewinding apparatus shown in the drawings but it will be understood that it may also be used in conjunction with the feed reel 12, if desired, or in conjunction with film reels used in hand-operated film-rewinding devices, or in conjunction with the supporting or driving shafts for the feed reels and take-up reels of motion picture projectors, and the like.

As shown in Figs. 3 and 4, the take-up reel 11 embodies two parallel rows of axially spaced inner and outer spokes 23 and 24, respectively, which are integrally attached to and radiate from central hub portions 25 and 25a, respectively. The hub portions 25 and 25a of the reel 11 are provided with openings 26 and 26a, respectively, for the reception of the rotary film reel-supporting shaft 13 and the supporting shaft 13 has a latch lever 27 pivotally mounted thereon, at one end thereof, as at 28, so as to retain the take-up reel 11 in position upon its supporting shaft 13 and against displacement axially thereof, when in use. Each of the hub portions 25 and 25a of the reel 11 is also provided with an annular row of openings 42 for the selective reception of a driving pin 38, as will be explained more fully hereinafter.

In the practice of the present invention, I provide a novel driving connection between the rotary film reel-supporting shaft 13 and the take-up reel 11 and this novel driving connection includes a key slot 29 which is provided in the shaft 13 and extends axially thereof, and a latch key 30 which is movable into and out of latching position in and relative to the key slot 29, this latch key 30 being mounted in a manner which will be described hereinafter.

The new driving connection includes a substantially annular or disc-shaped supporting member 31 which is removably mounted upon the shaft 13. The disc 31 includes a central boss portion 35 formed on the hub thereof and this boss portion 35 has a central opening 32 formed therein for the reception of the shaft 13 and the disc 31 is detachably keyed to the shaft 13, as at 33, so as to rotate with the shaft 13 at one side of the hub 41 of the standard 14 and between the hub 41 of the standard 14 and the film reel 11 on the shaft 13.

As shown in Figs. 5 and 6, the latch key 30 is pivotally mounted, as at 34, upon the boss 35 which is formed at the hub of the disc 31 so that the arm of the latch key 30 may be moved into and out of a position in which it is disposed in, and in axial alignment with, the slot 29 in the shaft 13, for a reason which will be explained more fully presently. Thus it will be noted that the latch key 30 has a hub portion 39 (Fig. 6) which projects into the key slot 29 in the shaft 13 when the arm of the key 30 is disposed at right angles to the long axis of the shaft 13, and when the key 30 is in this position (as in Fig. 6) the hub portion 39 thereof cooperates with the key slot 29 to form a driving connection between the disc 31 and the rotary film reel-supporting shaft 13. When thus disposed in one of its two possible effective positions (as may be seen by reference to Figs. 4, 5 and 6 of the drawings), the arm or body of the latch key 30 extends substantially parallel to the adjacent face of the disc 31 and lies between the hub 35 of the disc 31 and the film reel 11, with its outer surface substantially flush with the outer face or surface of the hub 35 of the disc 31.

However, the pivot or pin 34, by means of which the latch key 30 is pivotally mounted upon the hub 35 of the disc 31, is so disposed with reference to the periphery of the shaft 13, and with reference to the axis of the slot 29 therein, that the latch key 30 may be pivoted into a second alternative position in which the body or arm of the latch key 30 lies within the key slot 29. When so disposed the latch key 30 not only provides a driving connection between the disc 31 and the shaft 13 but it may also when in this position be used to provide a driving connection between a so-called film exchange type of film reel. This use of the latch key 30 is illustrated in Figs. 7 and 8 and will be referred to more fully hereinafter.

Film reels, such as the reels 11 and 12, are made in various styles and sizes by different manufacturers and are specifically adapted to support a predetermined length of film of a particular width, such as 16 mm. or 35 mm. film, and such film reels have hubs of varying constructions and diameters.

In order to accommodate the new driving connection to film reels made by different manufacturers, and which have hubs of varying constructions and diameters, I provide in the disc 31 a primary row or group of threaded sockets 36 and a secondary row or group of threaded sockets 37. These two groups or rows of threaded sockets 36 and 37 are arranged radially, in alignment, but are spaced approximately 180° apart on opposite sides of the center of the hub 25—25a of the reel 11. I also provide a driving element in the form of a pin 38 which has a threaded axially inner end portion which is selectively insertable into any one of the primary row of sockets 36 or into any one of the secondary or auxiliary row of sockets 37.

In that use of the invention which is illustrated in Figs. 1 to 6, inclusive, the disc 31 may be mounted upon the rotary supporting shaft 13 of the take-up reel 11 of a film rewinding device, such as is shown, or upon both the take-up reel and the feed reel of a film rewinding device, or upon the rotary supporting shaft for the take-up reel or the supporting shaft for the feed reel of a motion picture projector, or the like. This mounting of the disc 31 upon the shaft 13 is accomplished by merely inserting the shaft 13 through the central opening 32 in the hub of the disc 31.

When thus inserted into position upon the film-reel supporting shaft 13, the disc 31 may be keyed thereto, as at 33, to prevent movement of the disc axially of the shaft 13, whereupon the driving element or pin 38 may be inserted into a selected one of the primary row or group of threaded sockets 36. The latch key 30 may then be moved into the position in which it is shown in Fig. 5 and in full lines in Fig. 6, whereupon the film reel 11 may be slipped onto the shaft 13 with the driving pin 38 inserted into one of the openings 42 in the hub portion 25a of the reel 11. The latch lever 27 may then be moved into retaining or latching position, as shown in Fig. 4.

In the use of the film rewinding device in which the form of the invention shown in Figs. 1 to 6, inclusive, is embodied, the operating motor unit 21 may then be set in motion whereupon the same will act through the shaft 20, pulley 19, belt 17, and pulley 18 to rotate the rotary film-reel-supporting shaft 13 for the take-up reel 11 which, in turn, will then act through the film 40 to rotate the feed reel 12.

As pointed out hereinbefore, it is frequently necessary to stop and start film rewinding devices, for the purpose of enabling the operator to examine the film for possible breaks therein or other damage thereto, as well as for other reasons, and it has been found that when the take-up reel 11 is heavily loaded with the film 40 there is a tendency during the starting operation for the inertia of the heavily loaded reel 11 to shear the primary driving connection which has been customarily afforded heretofore by an ordinary key and slot connection between the film reel-supporting shaft and the film reel.

However, I have found that by providing the driving connection of the present invention, and which is provided by the disc 31, and the key 30 pivotally mounted thereon, and having a hub portion 39 engageable in the slot 29 in the shaft 13, and the driving element or pin 38, the heavily loaded reel will readily be driven partly through engagement of the driving element or pin 38 in an opening 42 in the hub portion 25 of the reel 11 and partly through engagement of the hub portion 39 of the latch lever 30 in the slot 29 in the shaft 13.

I have also found that the use of the novel driving connection between the film reel 11 and its rotary supporting shaft 13, which is provided by the pivoted latch key 30 and slot 29, facilitates the insertion of the disc 31, which forms part of the driving connection between the shaft 13 and the reel 11, onto the supporting shaft 13 as well as its removal therefrom, and without disassembling the entire unit as has been required heretofore in the art. Thus it will be seen that in removing the disc unit 31 of the driving connection 31—36—38 from its supporting shaft 13 it is merely necessary to move the latch lever 27 into axial alignment with the shaft 13, slip the reel 11 off from the shaft 13, loosen the set screw 33, move the pivoted latch key 30 into the slot 29 (as in dotted line position, Fig. 6), and then slip the disc 31 off from the shaft 13, the latch key 30 riding up on the tapered end of the slot 29 into parallel alignment with the periphery of the shaft 13 exteriorly thereof during the movement of the disc 31 along the shaft.

As pointed out hereinbefore, film reels for use in film rewinding devices, and film reels for use in motion picture projectors, are made by various manufacturers in various styles and shapes and includes hubs of varying constructions and diameters. In order, therefore, to accommodate the new driving connection to such different film reels, having hubs of different diameters I provide the primary row of threaded sockets 36 which are radially aligned in the disc 31 at one side of its center and the driving element or pin 38 may be selectively inserted into a preselected one of the sockets 36 so as to accommodate the pin 38 to film reels having hubs of different diameters and shapes and to various arrangements of holes or apertures in the disc-shaped hub portions of such film reels.

The secondary or auxiliary row of threaded sockets 37 is provided in the disc 31 of the auxiliary driving connection between the film reel 11 and its supporting shaft 13 so that in the event that the threads in the threaded sockets which are embodied in the primary row of threaded sockets 36 become worn the driving pin 38 may be inserted into one of the threaded sockets 37 in the auxiliary or secondary row of sockets 37.

The use of the invention in the manner in which it is illustrated in Figs. 7 and 8 will now be described and in these figures those parts of the invention which are similar to corresponding parts embodied in the form of the invention shown in Figs. 1 to 6, inclusive, have been given similar reference numerals followed by the additional reference character "a."

As referred to hereinbefore, the latch key 30 is disposed in the position in which it is shown in Fig. 5, and in the position in which it is shown in full lines in Fig. 6, when the driving element or pin 38 is engaged in one of the openings 42 in the hub portion 25a of the reel 11, as a part of the driving connection between the rotary film reel-supporting shaft 13 and the film reel 11. When in this position, the hub portion 39 of the key 30 engages in the key slot 29 in the shaft 13 and forms a driving connection between the shaft 13 and the disc 31 carried thereby.

However, as pointed out hereinbefore, there are certain types of manufactured film reels, known as film exchange reels, with which the driving element or pin 38 cannot be used since such film reels embody substantially solid and non-apertured disc-shaped side walls rather than apertured hub portions such as are embodied in the film reel 11. Such a so-called film exchange reel is fragmentarily shown in Figs. 7 and 8 of the drawings, wherein it is generally indicated at 43, and comprises a pair of disc-shaped hub portions 44. It is not practical to put holes or openings in the disc-shaped hub portions 44 of such so-called film exchange reels, such as the reel 43, for the reception of a driving element or pin such as the pin 38. However, each of the hub portions 44 of such film exchange reels 43, is shown in Figs. 7 and 8, is provided with a key slot 45 (Fig. 8). Hence when it is desired to mount such a so-called film exchange reel 43 on the shaft 13a this may be accomplished by merely removing the driving element or pin 38 from the disc 31a, while allowing the disc 31a to remain upon the shaft 13a, moving the latch key 30a into position in the slot 29a, parallel to the shaft 30a, Fig. 6, slipping the film exchange reel 43 onto the shaft 13a, and then moving the retaining latch or lever 27a into effective position. When the so-called film exchange reel 43 is thus mounted on the rotary film reel-supporting shaft 13a the latch key 30a is disposed in the key slot 29a in the shaft 13a, and extends parallel to the axis of the shaft 13a, and provides a driving connection between the film exchange reel 43 and its rotary film reel-supporting shaft 13a.

Hence it will be seen that the new driving connection may be readily adjusted for use in conjunction with various types of motion picture film reels now in use, and made by different manufacturers, by merely inserting the driving element or pin 38 into a selected one of the threaded sockets 36 or 37 in the disc 31, and manipulating the latch key 30 into one of its two alternative effective positions, as in full lines Fig. 6; and it will also be seen that the new driving connection may be readily adjusted for use with so-called film exchange reels, such as the film exchange reel 43, by removing the driving element or pin 38 from the disc 31 and moving the latch key 30 into the alternative position in which it is shown in Figs. 7 and 8, and as shown in dotted lines in Fig. 6.

It will thus be seen from the foregoing description, considered in conjunction with the accompanying drawings, that the present invention accomplishes its intended objects, and has the desirable advantages and characteristics, including those hereinbefore pointed out and others which are inherent in the invention.

I claim:

1. Apparatus of the character described comprising, in combination, a rotary motion picture film reel-supporting shaft, and means providing a driving connection between the said rotary film reel-supporting shaft and a film reel mounted thereon, said means including a slot formed in said rotary film reel-supporting shaft and extending axially thereof, a supporting member carried by said shaft, and a member pivotally mounted upon the said supporting member and engageable in the said slot in the said shaft.

2. Apparatus as defined in claim 1 in which the said driving connection includes a driving element carried by said supporting member and adapted to engage a portion of the film reel mounted upon the said film reel-supporting shaft at a predetermined distance radially from and relative to the axis of said rotary film reel-supporting shaft.

3. Apparatus as defined in claim 1 in which the said supporting member is in the form of a disc removably mounted upon the said rotary film reel-supporting shaft and in which the said driving connection includes a driving pin mounted upon the said disc in axial alignment with but spaced radially from the axis of said rotary film reel-supporting shaft and in which said driving pin is engageable with a portion of the film reel mounted upon the said rotary film reel-supporting shaft.

4. Apparatus as defined in claim 1 in which the said supporting member has the form of a disc removably mounted upon the said rotary film reel-supporting shaft and having a row of threaded sockets formed therein with the said row of threaded sockets extending radially in the said disc-shaped supporting member relative to the axis of the said rotary film reel-supporting shaft, and in which the said driving connection includes a driving pin having a threaded portion selectively insertable into any one of the said threaded sockets in the said row of the same, and in which said driving pin is adapted to having driving engagement with a portion of a film reel carried by the said rotary film reel-supporting shaft.

5. Apparatus of the character described comprising, in combination, a rotary motion picture film-reel supporting shaft, and means providing a driving connection between the said rotary film reel-supporting shaft and a film reel mounted thereon, said means comprising a key slot formed in the periphery of said rotary film reel-supporting shaft and extending axially thereof, a supporting member removably mounted upon the said rotary film reel-supporting shaft at the axially inner end thereof, and a latch key pivotally mounted upon the said supporting member and engageable in the said key slot.

6. Apparatus of the character described comprising, in combination, a rotary motion picture film reel-supporting shaft, and means providing a driving connection between the said rotary film reel-supporting shaft and a film reel mounted thereon, said means comprising a key slot formed in the periphery of said rotary film reel-supporting shaft and extending axially thereof, a supporting member removably mounted upon the said rotary film reel-supporting shaft at the axially inner end thereof, and a latch key pivotally mounted upon the said supporting member and having a hub portion engageable in the said key slot.

7. Apparatus of the character described comprising, in combination, a rotary motion picture film reel-supporting shaft, and means providing a driving connection between the said rotary film reel-supporting shaft and a film reel mounted thereon, said means comprising a key slot formed in the periphery of said rotary film reel-supporting shaft and extending axially thereof, a supporting member removably mounted upon the said rotary film reel-supporting shaft at the axially inner end thereof, and a latch key pivotally mounted upon the said supporting member and having an arm portion engageable in the said key slot.

8. Apparatus as defined in claim 5 in which the said supporting member is substantially disc-shaped and includes a hub provided with an opening for the reception of the said film reel-supporting shaft and in which the said hub of said disc-shaped supporting member has a laterally projecting boss thereon at one side of said disc, and in which said latch key has a portion pivotally mounted upon the said boss and engageable in the said key slot in said shaft to provide a driving connection between said disc-shaped supporting member and said rotary film reel-supporting shaft.

9. Apparatus as defined in claim 5 in which the said supporting member is substantially disc-shaped and includes a hub provided with an opening for the reception of the said film reel-supporting shaft and in which the said hub of said disc-shaped supporting member has a laterally projecting boss thereon at one side of said disc, and in which said latch key has a portion pivotally mounted upon the said boss and engageable in the said key slot in said shaft to provide a driving connection between said disc-shaped supporting member and said rotary film reel-supporting shaft, and in which said latch key has an arm portion adapted to lie within the said key slot in the said shaft and in axial alignment with said shaft so as to provide a driving connection between the said rotary film reel-supporting shaft and a film reel carried thereby.

FRED J. WENZEL.

REFERENCES CITED

The following references are of record in the file of this patent:

UNITED STATES PATENTS

| Number | Name | Date |
| --- | --- | --- |
| 1,840,926 | Williams | Jan. 12, 1932 |
| 2,254,605 | Foster | Sept. 2, 1941 |